United States Patent
Reinhart et al.

(10) Patent No.: US 9,964,068 B2
(45) Date of Patent: May 8, 2018

(54) HEAD GASKET FOR AN INTERNAL COMBUSTION ENGINE

(71) Applicant: Ford Global Technologies, LLC, Dearborn, MI (US)

(72) Inventors: Paul Thomas Reinhart, Livonia, MI (US); Mark Brenkus, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 15/053,286

(22) Filed: Feb. 25, 2016

(65) Prior Publication Data
US 2017/0248100 A1 Aug. 31, 2017

(51) Int. Cl.
*F02F 11/00* (2006.01)
*F16J 15/10* (2006.01)

(52) U.S. Cl.
CPC ........... *F02F 11/002* (2013.01); *F16J 15/104* (2013.01)

(58) Field of Classification Search
CPC ............................... F02F 11/002; F16J 15/104
USPC .............................. 123/193.3, 193.5; 277/593
See application file for complete search history.

(56) References Cited

U.S. PATENT DOCUMENTS

| | | | | |
|---|---|---|---|---|
| 5,033,426 A * | 7/1991 | Reichenbach | ......... | F02F 11/002 123/193.3 |
| 5,713,580 A * | 2/1998 | Ueta | ........... | F16J 15/0825 277/593 |
| 5,988,650 A * | 11/1999 | Plunkett | ........... | F02F 11/002 277/593 |
| 6,206,381 B1 * | 3/2001 | Ii | ........... | F02F 11/002 277/593 |
| 7,374,177 B2 * | 5/2008 | Tripathy | ........... | F16J 15/0825 277/593 |
| 7,726,662 B2 * | 6/2010 | Foster | ........... | F16J 15/0825 277/592 |
| 8,556,272 B2 | 10/2013 | Okano et al. | | |
| 8,632,077 B2 * | 1/2014 | Okano | ........... | F16J 15/0825 277/592 |
| 8,714,564 B2 * | 5/2014 | Ogaeri | ........... | F16J 15/0825 277/591 |
| 2003/0042689 A1 * | 3/2003 | Diez | ........... | F16J 15/0825 277/593 |
| 2003/0151211 A1 | 8/2003 | Chen et al. | | |

(Continued)

*Primary Examiner* — Marguerite McMahon
(74) *Attorney, Agent, or Firm* — Brooks Kushman P.C.; Greg Brown

(57) ABSTRACT

An engine is provided with a block forming a cylinder, a head, and a gasket positioned between the block and the head. The gasket has first and second outer layers and a distance layer positioned therebetween. The first layer defines a first aperture and a bead surrounding the cylinder. The distance layer defines a second aperture concentrically arranged between the first aperture and the bead. The gasket has a stopper layer extending inwardly from the distance layer to a circular stopper element positioned adjacent to and aligned with the first aperture. A method of sealing an engine includes compressing a gasket between a block and a head to form a primary seal at a first interface and a secondary seal at a second interface between first and second outer layers and an intermediate layer, the first interface being positioned between the second interface and a bead surrounding a cylinder.

18 Claims, 5 Drawing Sheets

(56) References Cited

U.S. PATENT DOCUMENTS

| | | | |
|---|---|---|---|
| 2003/0168818 A1* | 9/2003 | Pepin | F16J 15/0825 |
| | | | 277/593 |
| 2006/0163820 A1* | 7/2006 | Udagawa | F02F 11/002 |
| | | | 277/593 |
| 2011/0298186 A1 | 12/2011 | Klinner | |
| 2012/0175847 A1 | 7/2012 | Popielas et al. | |
| 2012/0261889 A1 | 10/2012 | Henne et al. | |
| 2014/0265156 A1 | 9/2014 | Okano et al. | |
| 2015/0369170 A1* | 12/2015 | Haberer | F02F 11/002 |
| | | | 277/593 |
| 2016/0053716 A1* | 2/2016 | Kim | F16J 15/0825 |
| | | | 277/593 |

* cited by examiner

HEAD GASKET FOR AN INTERNAL COMBUSTION ENGINE

TECHNICAL FIELD

Various embodiments relate to a head gasket for an internal combustion engine such as a compression ignition engine.

BACKGROUND

Internal combustion engines form a combustion chamber using two engine components, such as a cylinder head and a cylinder block. A deck face of the cylinder block cooperates with a deck face of the cylinder head to enclose the combustion chamber. A sealing member, such as a head gasket is positioned between the deck faces of the block and head to seal the combustion chamber during engine operation.

SUMMARY

In an embodiment, an engine is provided with a block forming a cylinder, a head, and a gasket positioned between the block and the head. The gasket has first and second outer layers and a distance layer positioned therebetween. The first layer defines a first aperture having a first diameter surrounding the cylinder and a bead surrounding the aperture. The distance layer defines a second aperture having a second diameter greater than the first diameter such that the second aperture is concentrically arranged between the first aperture and the bead. The gasket has a stopper layer extending inwardly from the distance layer to a circular stopper element, with the stopper element positioned adjacent to and aligned with the first aperture.

In another embodiment, an engine head gasket is provided with first and second outer layers, each layer having an aperture to surround a cylinder and a bead surrounding the aperture. An intermediate layer is positioned between the first and second layers and has a first axial thickness between the beads, a second axial thickness adjacent to the aperture, and a third axial thickness between the beads and the apertures, where the second thickness is less than the third thickness.

In yet another embodiment, a method of sealing an engine is provided and includes compressing a head gasket between a block and a head to form a primary seal at a first interface between first and second outer layers and an intermediate layer and form a secondary seal at a second interface between the first and second outer layers and the intermediate layer, the first interface being positioned between the second interface and a bead surrounding a cylinder.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
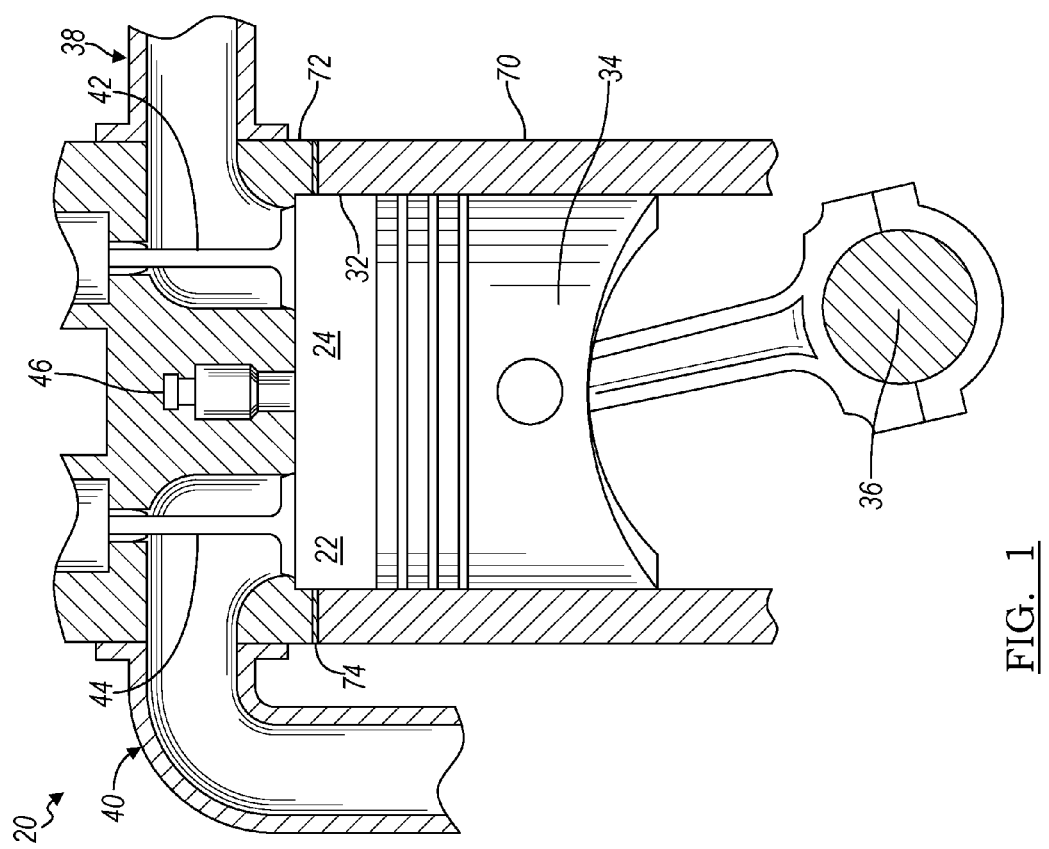
FIG. 1 illustrates an internal combustion engine capable of employing various embodiments of the present disclosure.

FIG. 1 illustrates a schematic of an internal combustion engine 20. The engine 20 has a plurality of cylinders 22, and one cylinder is illustrated. The engine 20 may have any number of cylinders, and the cylinders may be arranged in various configurations. The engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with the intake manifold 38 and the exhaust manifold 40. An intake valve 42 controls flow from the intake manifold 38 into the combustion chamber 24. An exhaust valve 44 controls flow from the combustion chamber 24 to the exhaust system(s) 40 or exhaust manifold. The intake and exhaust valves 42, 44 may be operated in various ways as is known in the art to control the engine operation.

A fuel injector 46 delivers fuel from a fuel system directly into the combustion chamber 24 such that the engine is a direct injection engine. In other examples, the fuel is delivered indirectly, for example, into a pre-combustion chamber in the head. The engine 20 may be configured as a compression ignition engine, for example, using a diesel fuel. The fuel is injected into the combustion chamber at a specified time and with swirl or other flow characteristics such that the fuel-air mixture auto-ignites during the compression stroke. In various examples, a glow plug or other device may be provided to assist in starting the engine. In other examples of the engine, the engine may be a spark ignition engine, or may be used with other fuels including gasoline, other fossil fuel based fuels, or renewable or biofuels such as biodiesel, bioethanol, and the like.

The engine 20 includes a controller and various sensors configured to provide signals to the controller for use in controlling the air and fuel delivery to the engine, the ignition timing, the power and torque output from the engine, the exhaust system, and the like. Engine sensors may include, but are not limited to, an oxygen sensor in the exhaust system 40, an engine coolant temperature sensor, an accelerator pedal position sensor, an engine manifold air pressure (MAP) or charge air sensor, an engine position sensor for crankshaft position, an air mass sensor in the intake manifold 38, a fuel pump speed sensor, a fuel rack position sensor, a fuel pressure sensor, an exhaust gas temperature sensor in the exhaust system 40, and the like.

In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two stroke cycle. During the intake stroke, the intake valve 42 opens and the exhaust valve 44 closes while the piston 34 moves from the top of the cylinder 22 to the bottom of the cylinder 22 to introduce air from the intake manifold to the combustion chamber. The piston 34 position at the top of the cylinder 22 is generally known as top dead center (TDC). The piston 34 position at the bottom of the cylinder is generally known as bottom dead center (BDC).

During the compression stroke, the intake and exhaust valves 42, 44 are closed. The piston 34 moves from the bottom towards the top of the cylinder 22 to compress the air within the combustion chamber 24. Fuel may be introduced into the combustion chamber 24 during the compression stroke for a compression ignition engine. As the pressure in the combustion chamber 24 increases during the compression stroke, the fuel-air mixture in the chamber will auto-ignite and combust. The timing of the fuel injection may be mechanically or electronically controlled with respect to the crank angle before TDC, for example, using a governor. If the timing is incorrect, the engine may experience increased noise or incomplete combustion.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust system 40 and to an aftertreatment system such as a catalytic converter or a diesel particulate filter. The engine 20 may additionally include various components such as a forced induction device including a turbocharger or supercharger, heat exchangers such as intercoolers, exhaust gas recirculation (EGR) systems, and the like.

The intake and exhaust valve 42, 44 positions and timing, as well as the fuel injection timing is controlled for the various engine strokes and to control the engine operation, and some examples is variable.

The engine 20 has a cylinder block 70 and a cylinder head 72 that cooperate with one another to form the combustion chambers 24. A head gasket 74 may be positioned between the block 70 and the head 72 to seal the chamber 24. The cylinder block 70 has a block deck face that cooperates with a head deck face of the cylinder head 72 to seal the combustion chamber with the head gasket 74.

The cylinder head may be a "flat head" design, with the ports for the intake and exhaust valves and the roof region of the cylinder being co-planar with the deck face of the head.

The engine 20 includes at least one fluid system (not shown). The fluid systems may include a cooling system to remove heat from the engine 20, and a lubrication system to lubricate moving engine components.

Figure 2:
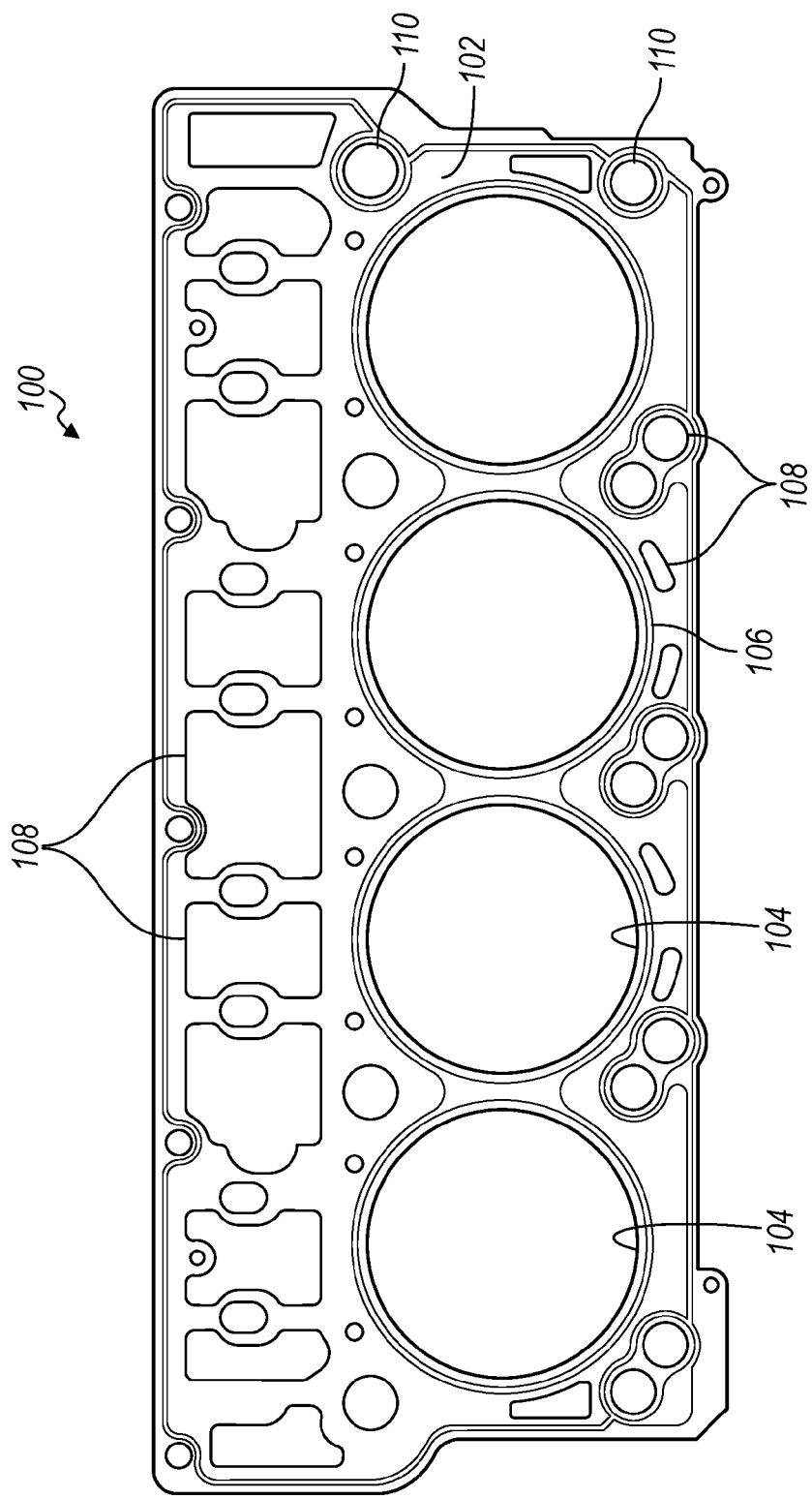
FIG. 2 illustrates a perspective schematic view of a head gasket for use with the engine of FIG. 1 according to an embodiment.

FIG. 2 illustrates a perspective schematic view of a head gasket 100 according to an embodiment. The head gasket 100 may be used as the head gasket 74 in the engine 20 as illustrated in FIG. 1. The head gasket 100 is illustrated for use with a four cylinder engine; however, it may be reconfigured for use with an engine having more or less than four cylinders, and for use with engines in various configurations including in-line cylinders, a v-configuration engine, and the like.

The gasket 100 has a first side 102 that mates with a deck face of a cylinder head and a second opposed side that mates with a deck face of a cylinder block of the engine. The head gasket defines apertures 104 and gasket beads 106 that surround each cylinder in the engine to seal the cylinder. The head gasket may also have various apertures 108 therethrough that allows for the flow of intake gases, exhaust gases, coolant, and/or lubricant from the block to the head or vice versa and across the gasket. The gasket also defines various apertures 110 such as bolt holes that allow a head bolt to pass through the gasket when connecting a cylinder head to the cylinder block.

In one example, the gasket 100 is constructed from multiple layers, and each layer may be made from steel or another suitable material. For example, the gasket 100 may be a multi-layer steel (MLS) gasket. In various examples, the layers may all be formed from the same material or may be formed from different materials or alloys. Each layer may be stamped or otherwise processed to provide features associated with the layer such as apertures 108, 110, gasket beads 106, and the like.

In one example, the gasket 100 is configured for use with a diesel engine. A diesel engine may require robust sealing by the gasket based on the high combustion pressures and high thermal loads that occur during engine operation. In one example, the diesel engine may be a light or medium duty engine and experience compression ratios above 14:1, with compression ratios up to or above 23:1. Peak operating pressure in-cylinder in the engine may be 170 bar or more for a naturally aspirated engine, and higher peak pressures for a forced induction engine.

Figure 3:
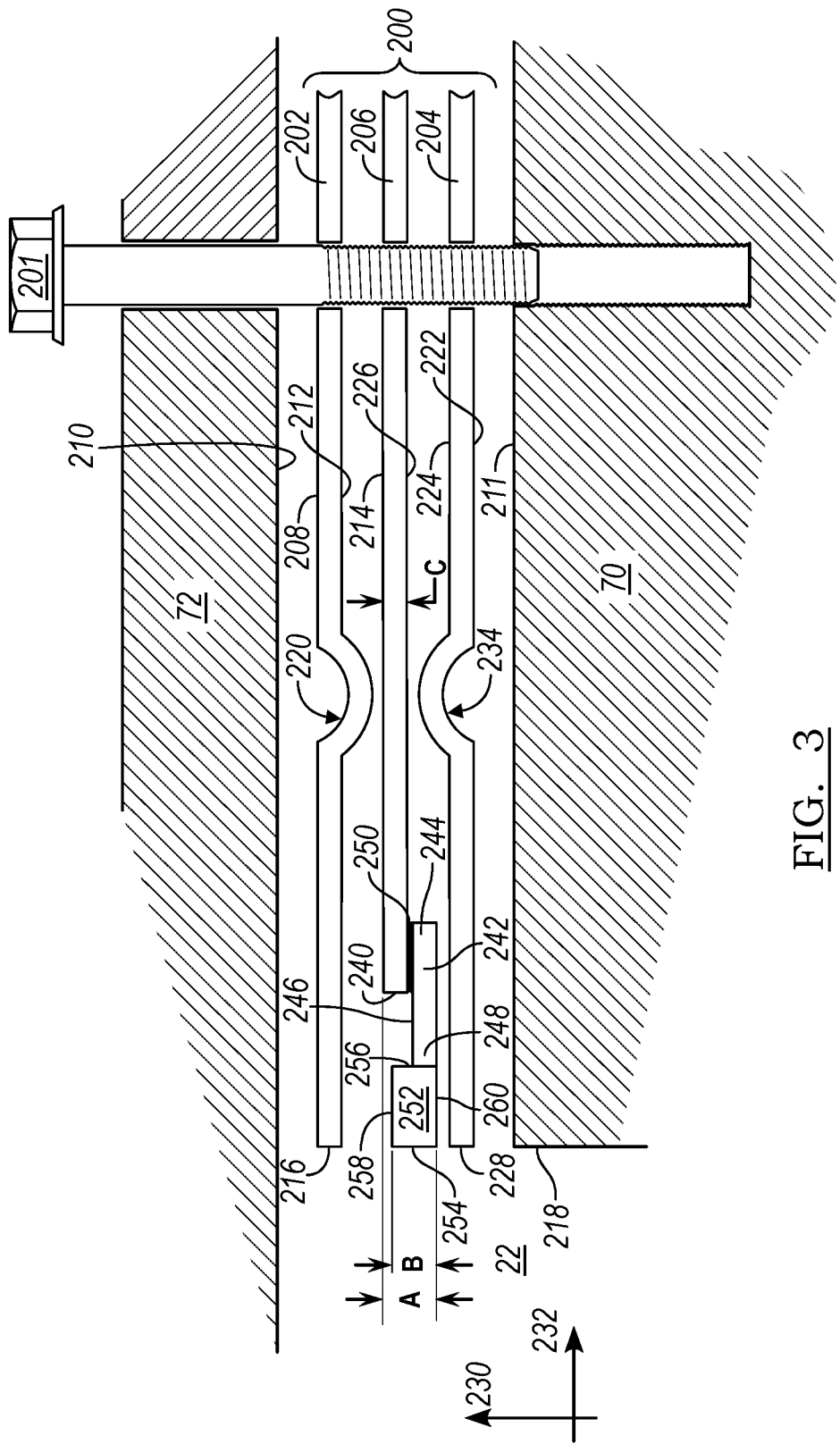
FIG. 3 illustrates a sectional partial view of the head gasket of FIG. 2 in an engine in an uncompressed state.
Figure 4:
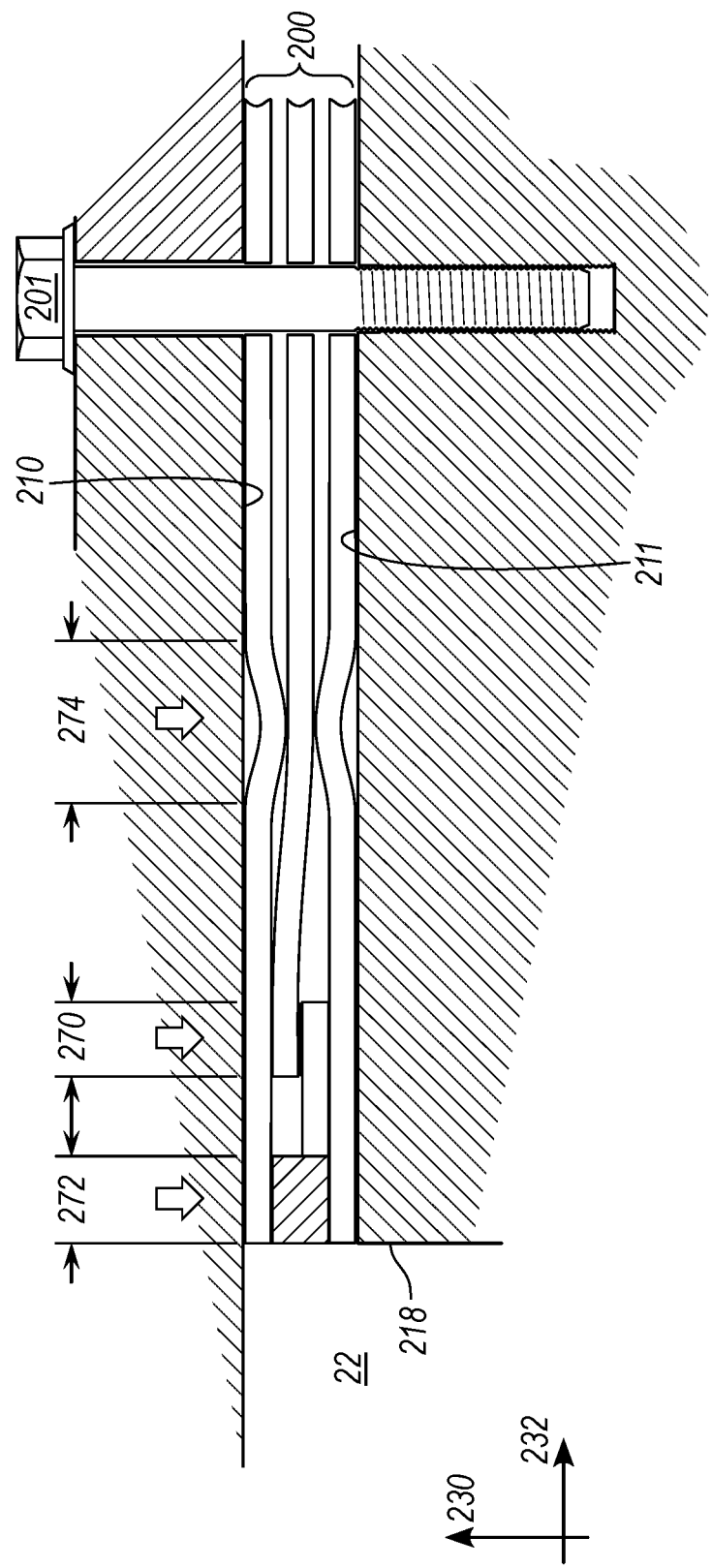
FIG. 4 illustrates a partial sectional view of the head gasket of FIG. 2 in an engine in a compressed state.
Figure 5:
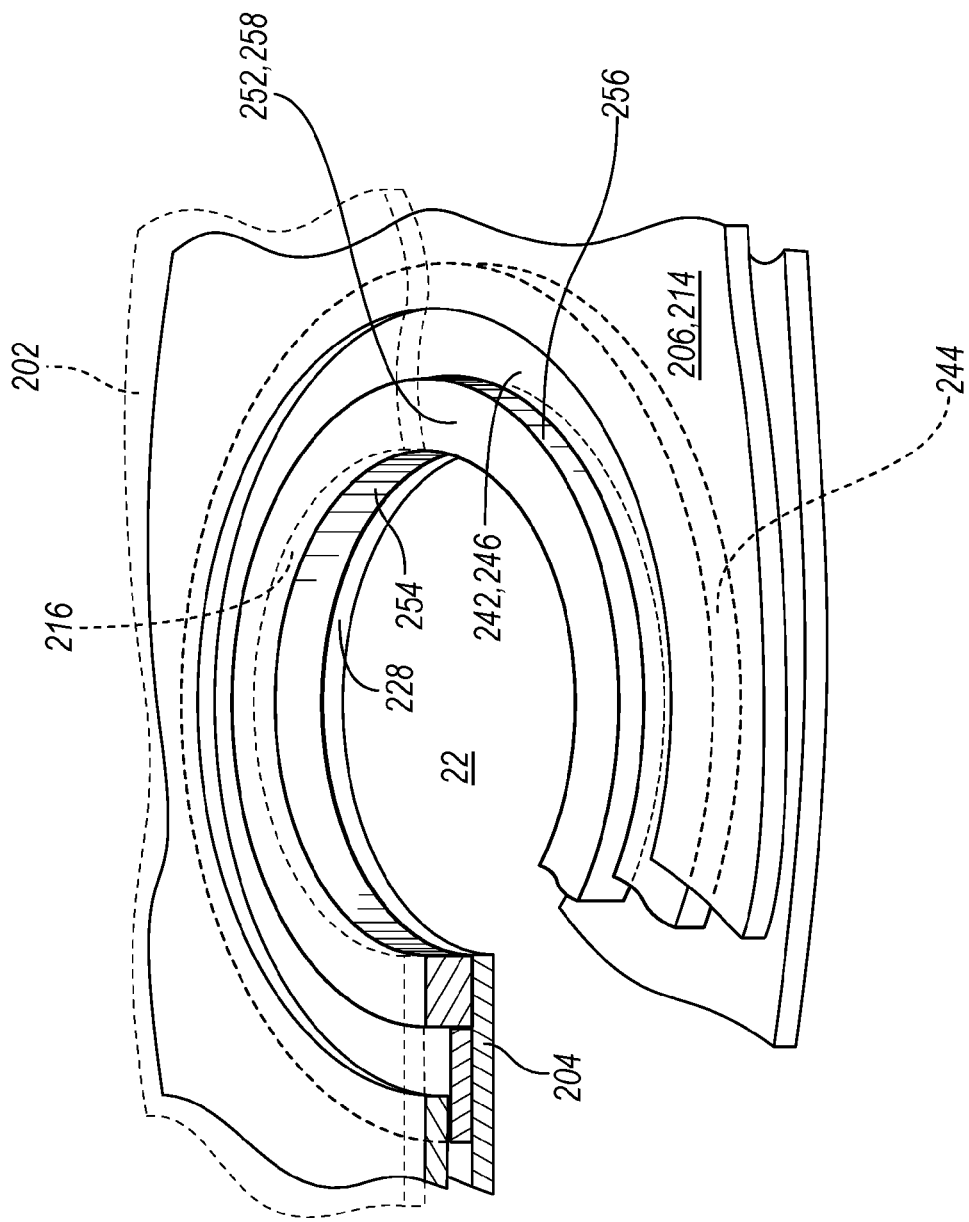
FIG. 5 illustrates a partial perspective view of the head gasket of FIG. 3.

FIGS. 3-5 illustrate various partial views of a head gasket 200 for an engine, such as engine 20. FIG. 3 illustrates the head gasket 200 in an uncompressed or free state before the head 72 is fastened to the cylinder block 70 and the head bolts 201 connecting the head to the block are tightened. FIG. 4 illustrates the head gasket 200 in a compressed state after the head bolts 201 connecting the head 72 to the block 70 are tightened to a specified torque value. FIG. 5 illustrates a partial perspective view of the gasket 200. The head gasket 200 may be head gasket 100 or 74. The head gasket 200 prevents the flow of in-cylinder gases past a bead surrounding the cylinder to prevent or reduce aeration failures of the engine. During operation, the air-fuel mixture in the cylinder ignites which causes a pressure increase in-cylinder, and may cause a deflection or bending motion of the cylinder head into the bore wall. This motion may lead to fatigue or cranking of layers of one or more layers of the gasket behind the bore wall. The disclosed gasket 200 provides for compliance of the gasket 200 at the bore wall and prevents or reduces issues with gasket fatigue or failure while maintaining sealing of the cylinder 22.

The engine is generally provided by the block 70 and head 72 and may be a compression ignition engine such as a diesel engine. The head 72 may be configured as a "flat head" with a planar deck face and roof defining intake and exhaust ports for the cylinder, or the head may define concave regions for the cylinder roofs in other examples.

The disclosed gasket 200 seals one or more cylinders 22 in diesel or other engine applications to prevent the flow of gases out of the cylinder, and to prevent the flow of fluids such as coolant or lubricants into the cylinder. The gasket 200 is configured as a multiple layer gasket, for example, an MLS gasket, with a double stopper feature providing primary and secondary sealing functions and the combustion bead providing a third seal such that the gasket provides three levels of cylinder or combustion sealing.

Referring to FIGS. 3 and 5, the gasket has a first outer layer 202, a second outer layer 204, and an intermediate distance layer 206. The first outer layer 202 has an outer face 208 that mates with the deck face 210 of the cylinder head 72, and an inner face 212 that mates with a first face 214 of the distance layer 206. The outer layer 202 has an edge 216 that forms a circular aperture through the layer that is aligned with the bore wall 218 of the cylinder 22 and at least partially defines the aperture of the gasket, such as aperture 104.

The first outer layer 202 forms a bead 220. The bead 220 may be formed by a concave surface on the outer face 208 and a corresponding convex surface on the inner face 212. The bead 220 may also be formed in an opposed manner, with the outer face 208 forming the convex surface and the inner face 212 forming the concave surface. The bead 220 is shown as a single bead; however, it is also contemplated that the bead 220 may include a double bead, or other shaped bead. The bead 220 may be provided in the outer layer 202 via a stamping process or the like.

The second outer layer 204 has an outer face 222 that mates with the deck face 211 of the cylinder block 70, and an inner face 224 that mates with a second face 226 of the distance layer 206. The outer layer 204 has an edge 228 that forms a circular aperture through the layer that is aligned with the bore wall 218 of the cylinder 22 and at least partially defines the aperture of the gasket, such as aperture 104. The edge 228 or aperture of the outer layer may be aligned with the edge 216 or aperture of the other outer layer 202 along an axial direction 230. Note that the axial direction 230 and a transverse direction 232 are illustrated and the axial direction 230 may be aligned with the longitudinal axis of the cylinder 22.

The second outer layer 204 forms a bead 234. The bead 234 may be formed by a concave surface on the outer face 222 and a corresponding convex surface on the inner face 224. The bead 234 may also be formed in an opposed manner, with the outer face 222 forming the convex surface and the inner face 224 forming the concave surface. The bead 234 is shown as a single bead; however, it is also contemplated that the bead 234 may include a double bead, or other shaped bead. The bead 234 may be provided in second outer layer 204 via a stamping process or the like.

The beads 220, 234 may be aligned or overlapped with one another, and in one example are directly opposed to one another and in another example are transversely offset from one another while maintaining an overlap. The beads 220, 234 may be the same size and shape or different sizes and shapes. In other examples, only one of the outer layers 202, 204 is provided with a bead and the other layer is a planar element.

In other examples, the gasket 200 has more than three layers 202, 204, 206, for example, with two or more distance layers 206 positioned between the outer layers 202, 204.

A center or distance layer 206 is used as a spacer layer between the outer layers 202, 204, and may assist in determining the gasket thickness. The distance layer 206 may also assist in sealing the cylinders 22 of the engine by cooperating with the outer layers 202, 204 as described below. The distance layer 206 and first and second outer layers 202, 204 may be the same thickness or may be different thicknesses. In one example, the first and second outer layers 202, 204 have a common thickness, and the distance layer 206 has a greater thickness than an outer layer.

The distance layer 206 has first and second opposed faces 214, 226 with a circular aperture 240 formed therethrough such that the faces 214, 226 are separated by an edge 240. The aperture or edge 240 is positioned between the beads 220, 234 and the apertures or edges 216, 228 of the outer layers 202, 204 that define the gasket aperture surrounding the cylinder. The aperture or edge 240 is spaced apart from the beads 220, 234 and spaced apart from the apertures or edges 216, 228 in the transverse direction 232. In one example, the aperture 240 has a diameter that is greater than a diameter of the apertures 216, 228, and less than a diameter of the beads 220, 234.

The distance layer 206 is positioned between the first and second outer layers 202, 204 such that the first face 214 contacts outer layer 202 and the second face 226 contacts outer layer 204 when the gasket 200 is compressed, for example, as shown in FIG. 4.

A stopper layer 242 is positioned between the first and second outer layers 202, 204, and is connected to the distance layer 206. The stopper layer 242 has one end 244 or end region and another end 248 or end region. The end 244 is connected to the distance layer 206 adjacent to the edge 240 of the distance layer 206. The edge 240 of the aperture of the distance layer may be positioned between the two ends 244, 248 of the stopper layer 242 as shown. The stopper layer 242 has a face 246 that is connected to one of the faces 214, 226 of the distance layer. In the example shown, the face of 246 of the stopper layer is connected to face 226 of the distance layer, such that the end 244 of the stopper layer is positioned between the distance layer 206 and the outer layer 204. In other examples, the end 244 of the stopper layer 242 is positioned between the distance layer 206 and the outer layer 202. The stopper layer 242 may have a generally cylindrical shape.

The end 244 or end region of the stopper layer 242 overlaps the edge 240 of the distance layer 206 in an overlap region 250. The overlap region 250 has a thickness A in the axial direction, or the combined thicknesses of the distance and stopper layers 206, 242 have a thickness A. The stopper layer 242 may be connected to the distance layer 206 via a welding process or other fastening process. In another example, the stopper layer 242 may be integrally formed with the distance layer 206 The stopper layer 242 may be formed from the same material or alloy as the distance layer 206, or may be formed from another material or alloy.

The stopper layer 242 extends from the aperture or edge 240 of the distance layer 206 to a stopper element 252 that is connected to the second end 248 of the stopper layer. In one example, the stopper element 252 is connected to the end 248 of the stopper layer 242, for example, via a welding process or the like. In another example, the stopper element 252 is integrally formed with the stopper layer 242. The stopper element 252 is positioned adjacent to the aperture of the gasket 200 and in-line with the bore wall 218 of the cylinder. The stopper element 252 has a thickness B in the axial direction. The thickness B of the stopper element 252 is less than the thickness A of the stopper and distance layers in the overlap region 250. The stopper element 252 may have a generally cylindrical shape. The distance layer has a thickness C between the beads 220, 234, and the thickness C is less than the thicknesses A and B, such that C<B<A.

The stopper element 252 has a first side wall 254 and a second side wall 256. The first side wall 254 cooperates with the edges 216, 228 to define the aperture of the gasket. The second side wall 256 is connected to the end 248 of the stopper layer 242, for example, via a butt joint as shown, or via an overlapped connection. The stopper element 252 is therefore spaced apart from the distance layer 206 in the transverse direction 232.

The distance layer 206, stopper layer 242, and stopper element 252 cooperate to provide an intermediate layer for the gasket. In one example, the distance layer 206, stopper layer 242, and stopper element 252 include multiple components that are connected to one another to provide internal layers of the gasket. In another example, the distance layer 206, stopper layer 242, and stopper element 252 are formed from a single piece of material, for example, in a stamping or other machining process. For example, a sheet of material may be stamped or otherwise formed in the shape of the layer, and material may be filled into any cavities formed during the stamping process to provide the stopper element 252 and overlap region of the layers 206, 242.

The stopper element 252 has a face 258 that mates with the face 212 of the outer layer 202, and an opposed face 260 that mates with a face 224 of the outer layer 204.

The distance layer 206, stopper layer 242, and stopper element 252 are illustrated as having a step like structure, with discontinuities along the upper surfaces and discontinuities along the lower surfaces of the layers and element. In other examples, the upper and lower surfaces may each be a smooth continuous surface while still providing the desired thicknesses in the appropriate regions to form the sealing structure of the gasket.

The gasket 200 may be used with an engine having the cylinders arranged in various configurations, for example, with coolant channels between adjacent cylinders or with the cylinders being conjoined or siamesed. In one example, for any engine configuration, the stopper layer and stopper element may have the same dimensions surrounding each cylinder. For engines with cylinders being arranged in close proximity to an adjacent cylinder, for example, in a siamesed cylinder engine or for engines with a narrow bore bridge or land area, the stopper element may be narrower in the interbore region. In a further example of an engine with a narrow interbore region, the stopper layer may be conjoined in the interbore region such that stopper elements for adjacent cylinders are connected to opposed ends of a single stopper layer that extends outwardly from both sides of the distance layer in the interbore region, with the gasket 200 having the structure as described above for the remaining periphery of the cylinder away from the interbore region.

Referring to FIG. 4, the gasket 200 is illustrated in the compressed state, for example, when the engine is assembled and ready for operation as the head bolts have been tightened and the gasket is compressed between the deck faces of the engine. The gasket 200 forms a first seal around the cylinder at a first interface between the overlap region, the outer layers of the gasket, and the deck faces. The gasket forms a second seal around the cylinder at a second interface between the stopper element, the outer layers of the gasket, and the deck faces. The gasket also forms a third seal around the cylinder at an interface between the distance layer, the beads of the gasket, and the deck faces. The three seals provide improved sealing for the cylinder to prevent exhaust gases from leaving the cylinder, even during peak pressures and thermal loads.

To compress the gasket 200 to the installed state as shown in FIG. 4, the head bolts 201 are tightened to a specified torque level, which provides a corresponding tension in the head bolts 201. As the thickness A of the overlap region 250 between the distance and stopper layers 206, 242 is greater than a thickness B of the stopper element 252, a first clamping load is provided at the first seal 270 by the deck faces 210, 211 that is greater than a second clamping load provided at the second seal 272 by the deck faces 210, 211. Note that the clamping load is in the axial direction.

The first seal 270 therefore has a first clamping load that is greater than a second clamping load of the second seal 272 due to the greater thickness A of the overlap region 250 and gasket 200 at the first seal 270 compared to the thickness B at the second seal 272. As the first clamping load is greater than the second clamping load due to a difference in thicknesses in the axial direction 230, the first clamping load is greater than the second clamping load regardless of the operating conditions, e.g. operating temperature and pressure of the cylinder 22. As the first seal 270 has a greater clamping load than the second seal 272, the first seal 270 is the primary seal for the gasket 200, and the second seal 272 is a secondary seal. The third seal 274 is a tertiary seal as it is formed due to flexure of the gasket beads 220, 234, and has a third clamping load that is related to the thickness C and the compliance of the beads 220, 234 where the third clamping load is less than the first and second clamping loads.

The second clamping load for the second seal 272 will vary based on the operating conditions or state of the cylinder 22 and engine. For example, the second clamping load increases with increasing operating temperature and pressure of a cylinder 22, as the stopper element 252 will thermally expand.

The gasket 200 is formed such that the secondary seal 272 provided by the stopper element 252 is positioned adjacent to the cylinder bore wall 218 and in-cylinder gases, and the secondary seal 272 is positioned between the cylinder 22 and the primary seal 270 provided by the overlap region 250 of the distance and stopper layers. Both the primary and secondary seals 270, 272 are provided and positioned between the bore wall 218 of the cylinder and the third seal 274 provided by the gasket beads. By spacing the first seal 270 away from the bore wall 218, and positioning the second seal 272 between the first seal 270 and the bore wall 218, the gasket 200 has improved functional sealing to prevent in-cylinder gases from leaking into or across the bead and prevent aeration of the engine. The second seal 272 prevents overcompression of the gasket 200 at the bore wall 218 to protect the third seal 274 formed with the gasket beads. The position of the first seal 270 away from the bore wall 218 allows for some compliance in the gasket 200 at the bore wall 218 as the head bends into the bore wall at peak cylinder pressure and peak loads during engine operation and the second clamping load is less than the first clamping load. This added compliance of the gasket 200 at the bore wall 218, with the three seals 270, 272, 274 provided in the gasket, provide for improved sealing of the cylinder 22 as well as a reduction in fatigue or cracking of gasket 200 layers that may otherwise occur with a primary seal adjacent to the bore wall.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:
1. An engine comprising:
  a block forming a cylinder;
  a head; and a gasket positioned between the block and the head, the gasket having first and second outer layers and a distance layer positioned therebetween, the first layer defining a first aperture having a first diameter surrounding the cylinder and a bead surrounding the aperture, the distance layer defining a second aperture having a second diameter greater than the first diameter such that the second aperture is concentrically arranged between the first aperture and the bead, the gasket having a stopper layer extending inwardly from the distance layer to a circular stopper element, the stopper element positioned adjacent to and aligned with the first aperture;

wherein the stopper element has a first thickness in an axial direction of the gasket;

wherein the distance layer and stopper layer are connected via an overlap therebetween to provide a second thickness in an axial direction; and wherein the second thickness is greater than the first thickness.

2. The engine of claim 1 wherein the distance layer has a third thickness, the third thickness less than the first thickness.

3. The engine of claim 1, wherein the engine is a compression ignition engine and the head has a planar deck face defining intake and exhaust ports for the cylinder.

4. An engine head gasket comprising:
first and second outer layers, each layer having an aperture to surround a cylinder and a bead surrounding the aperture; and
an intermediate layer positioned between the first and second layers, the intermediate layer having a first axial thickness between the beads, a second axial thickness adjacent to the aperture, and a third axial thickness between the beads and the apertures, the second thickness less than the third thickness.

5. The gasket of claim 4 wherein the second thickness is greater than the first thickness.

6. The gasket of claim 4 wherein the intermediate layer further comprises:
a distance layer positioned between outer layers and having first and second opposed faces defining an aperture therethrough, an edge of the aperture positioned between the beads and the apertures of the first and second layers to surround a cylinder, the distance layer having the first axial thickness;
a stopper layer having a first end connected to the first face adjacent to the edge to provide the third axial thickness and a second opposed end; and
a stopper element connected to the second end of the stopper layer and adjacent to the aperture, the stopper element having the second axial thickness.

7. The gasket of claim 6 wherein the edge is positioned between the first and second ends of the stopper layer.

8. The gasket of claim 6 wherein the stopper element has a first side wall partially defining the aperture and a second opposed side wall connected to the second end of the stopper layer.

9. The gasket of claim 6 wherein the stopper element is spaced apart from the distance layer.

10. The gasket of claim 6 wherein the second thickness of the stopper element is greater than the first thickness of the distance layer.

11. The gasket of claim 6 wherein the distance layer is positioned between the first and second outer layers such that the first face contacts the first layer and the second face contacts the second layer when the gasket is compressed.

12. The gasket of claim 4 wherein the first outer layer has an outer face and an opposed inner face, the inner face positioned adjacent to the intermediate layer, the outer face defining the bead as a concave surface, the inner face defining the bead as a convex surface.

13. A method of sealing an engine comprising:
compressing a head gasket between a block and a head thereby forming a primary seal at a first interface between first and second outer layers and an intermediate layer and forming a secondary seal at a second interface between the first and second outer layers and the intermediate layer, the first interface is positioned between the second interface and a bead surrounding a cylinder, wherein compressing the head gasket requires a first clamping load to provide the primary seal and a second clamping load to provide the secondary seal, the second load is less than the first load.

14. The method of claim 13 wherein the intermediate layer further comprises a stopper layer and a distance layer at the first interface such that the first interface is provided between the first and second outer layers, the stopper layer, and the distance layer of the gasket; and
wherein the intermediate layer further comprises a stopper element such that the second interface is formed between the first and second outer layers and the stopper element, the stopper layer connecting the stopper element to the distance layer.

15. The method of claim 13 wherein the first clamping load is greater than the second clamping load regardless of operating temperature and pressure of the engine.

16. The method of claim 13 wherein the second clamping load increases with increasing operating temperature of a cylinder.

17. The method of claim 13 wherein the head gasket is compressed to form a tertiary seal at an interface between a bead formed by the first outer layer and the intermediate layer.

18. The method of claim 13 wherein a thickness of the intermediate layer at the first interface in an axial direction is greater than a thickness of the intermediate layer at the second interface in the axial direction.

* * * * *